United States Patent [19]

Vardi et al.

[11] Patent Number: 4,522,720

[45] Date of Patent: Jun. 11, 1985

[54] LIQUID MIXING DEVICE

[75] Inventors: Isaih Vardi, Rehovoth; Joseph Bourne, Raanana; Jonathan Ben-Dror, Hadar Am; Yigal Kimchi, Ramat Gan, all of Israel

[73] Assignee: Eshel Residual for Cooling and Heating Ltd., Azor, Israel

[21] Appl. No.: 484,011

[22] Filed: Apr. 18, 1983

Related U.S. Application Data

[63] Continuation of Ser. No. 246,186, Mar. 23, 1981, abandoned.

[30] Foreign Application Priority Data

Mar. 25, 1980 [IL] Israel ....................................... 59707

[51] Int. Cl.[3] .............................................. B01D 21/26

[52] U.S. Cl. ................................................... 210/512.1

[58] Field of Search ............... 210/512.1, 512.2, 512.3, 210/787, 789, 801, 803, 304, 251

[56] References Cited

U.S. PATENT DOCUMENTS 2,964,179 12/1960 Loevenstein et al. .......... 210/801 X 3,517,821 6/1970 Monson et al. .................. 210/512.1

3,854,701 12/1974 Palma ............................. 210/304 X 4,111,804 9/1978 Pichon ......................... 210/512.1 X 4,153,558 5/1979 Frykhult ...................... 210/512.1 X

*Primary Examiner*—Thomas Wyse

*Attorney, Agent, or Firm*—Fleit, Jacobson, Cohn & Price

[57] ABSTRACT

The present invention relates to an improvement for use in a device where a liquid floating on top of another liquid is to be drained to another part of the device, and where these are to be intimately mixed with each other in the form of a vortexinducing structure comprising at least one curved vane located above the exit port of the liquid, the vane extending substantially to the upper level of the liquid system, a lateral inlet being provided along a larger part of the vane structure. Preferably the device comprises a helical vane extending to the top level of the upper liquid, positioned above the outlet port. The invention further relates to an absorption machine of the lithium halide/water (lithium bromide and/or lithium chloride) type, equipped with at least one vortex inducing structure defined above and to a method of thoroughly mixing a lithium halide solution with 2-ethyl-n-hexanol used as additive, which comprises equipping an exit port of a compartment of an absorption machine of this type with a device defined above and draining the lithium halide/additive system through the exit port and circulating it to another part of the machine.

5 Claims, 6 Drawing Figures

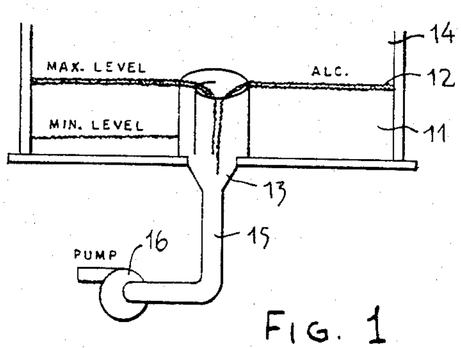
FIG. 1
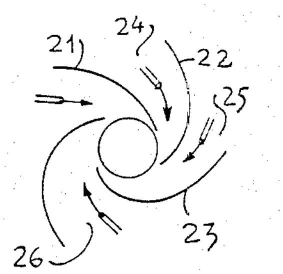
FIG. 2
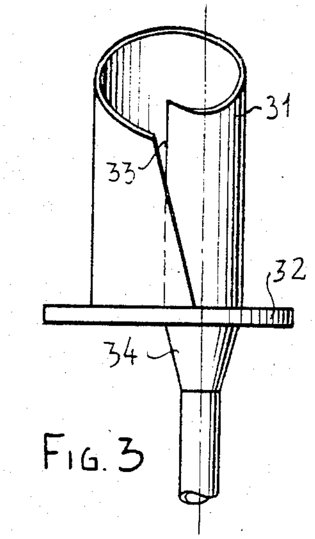
FIG. 3
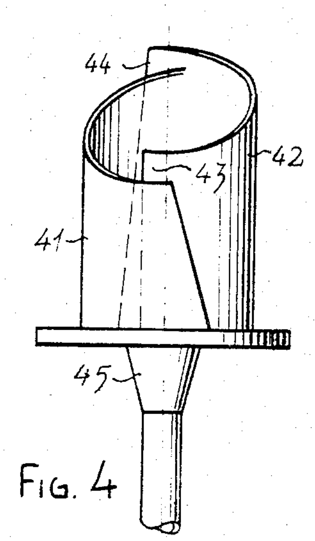
FIG. 4
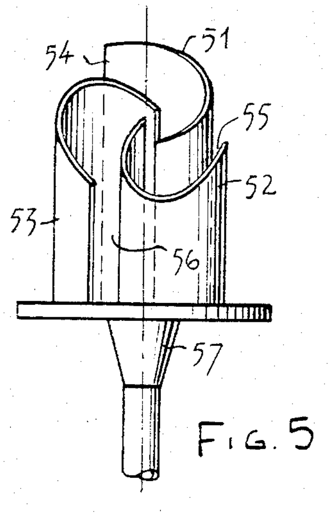
FIG. 5
FIG. 6
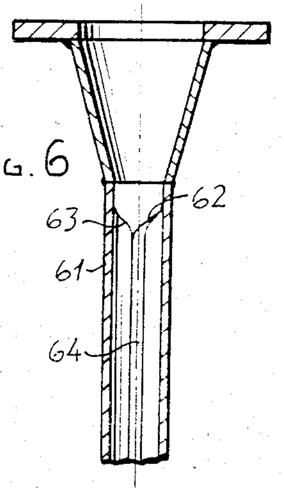

LIQUID MIXING DEVICE

This application is a continuation of application Ser. No. 246,186, filed Mar. 23, 1981 abandoned.

FIELD OF THE INVENTION

The present invention relates to improvements in absorption machines of the type based on a lithium-bromide/water or lithium chloride/water cycle/or which use a similar absorbent. The improvement relates to means for removing the surface layer of 2-ethyl-n-hexanol, or of similar substances, which are used as additives in such machines, and which tend to accumulate at the surface of the lithium halide/water layer. The novel device is also of use in other fields of chemical industry.

BACKGROUND OF THE INVENTION

Various devices are operated based on a lithium halide/water, and preferably lithium bromide/water cycle. Many years of experience have shown that the use of 2-ethyl-n-hexanol has a very substantial favorable influence on the capacity of such devices, and an improvement of up to about 50 percent in capacity, with improvements in efficiency and reliability, is attained by the use of such additive. Other alcohols of organic compounds having similar properties can be used for this purpose.

The 2-ethyl-n-hexanol has a smaller density than water and is not soluble in or miscible with water. Thus this additive tends to form a surface layer on top of the aqueous lithium halide (lithium bromide or lithium chloride) layer. The ethyl hexanol floats at the surface, particularly in the absorber and in the evaporator of machines of this type: in the absorber on top of the LiBr layer, and in the evaporator on top of the water layer. This prevents the circulation of this additive through the machine and reduces its beneficial effect, and the efficiency is reduced. Due to this effect the machine operates not at peak efficiency, and it is necessary in conventional devices to add from time to time additional 2-ethyl-n-hexanol, which is also a quite expensive substance. Hitherto no effective means have been provided for maintaining the said additive in circulation, at its full capacity.

SUMMARY OF THE INVENTION

The present invention relates to means for effectively removing the surface layer of 2-ethyl-n-hexanol, or of similar compounds, from water and aqueous solutions of the lithium halide type used in absorption refrigerating machines and for attaining a full utilization of the beneficial effects of such additive. The device according to the present invention comprises means for inducing vortex formation at a location where water or aqueous lithium halide is drained from one part of the absorption device and circulated to the other, resulting in an intimate mixing of the additive with the water or aqueous solution, this maintaining said additive in effective circulation and resulting in the full effectiveness of said additive in the refrigeration cycle. The means according to the invention relates to one or more vanes, of suitable size and geometry, which are positioned in the containers of said aqueous systems above the outlet means of the water or aqueous lithium halide, said new structure resulting in the formation of a vortex in which an intimate mixing of the additive with water or with the lithium halide solution is attained, and thus there is circulated through the device a liquid containing said additive as admixture, in a form at which its exerts its full beneficial effect. The need to add further quantities from time to time is essentially obviated and when a suitable quantity of the said additive is added at the start of the operation of the machine, this maintains its efficiency over prolonged periods of time. Such vane structures are provided at the outlet of the absorber, and if desired also at the outlet of the evaporator and there is obtained the result that any additive floating on top of the aqueous layer is entrained in, and thoroughly admixed with said aqueous liquid leaving the respective compartments. For smaller devices a single perpendicular vane of suitable geometry is adequate. For larger devices a structure of a plurality of vanes is advantageously used. When a single vane is used, this may be in the form of a rigid upright member, attached to the bottom plane of the container of the aqueous liquid, substantially around the outlet means of same, said rigid plate formed member being bent in a curved or helical shape, adapted to provide an entrance along substantially its entire height for the liquid in said compartment, the shape of the vane being such as to induce formation of a vigorous vortex in the liquid removed through said outlet from said compartment, said vortex resulting in the entrainment of the additive which floats on top of the aqueous layer. If desired vortex formation can be enhanced by resorting to the use of jets which are fed from a bypass of an existing pump or by a small liquid pump. The vanes can be perpendicular to the surface of the liquid in said compartment, or they may be of a funnel-shaped structure, said structure being provided with one or more lateral openings, said structure extending substantially to the uppermost level of the liquid in the respective compartment. The vortex is induced by a stationary vane structure, and there is attained an efficient entrainment of the additive. Vane structures of about 10 to 20 inch diameter with adsorption machines of 5 to 20 feet length have been found adequate for the intended purposes.

Vortex-inducing structures of the present invention can be used in industry and especially in chemical industry whenever it is required to result in an intimate mixture of a liquid which is lighter than another and which floats on top of the heavier liquid, and which liquids are to be circulated to another part of the device.

The vortices induced are quite strong, and sometimes when a full intimate admixture has been attained, it is advantageous to provide a straightening vane adjacent to the outlet so as to stop or at least reduce the circular motion of the liquid at said outlet, before it reaches the pump located adjacent to the said outlet.

The invention is illustrated with reference to the enclosed schematical drawings, which are not according to scale and in which:

FIG. 1 is a schematical vertical section through a device equipped with a vortex inducing device according to the invention;

FIG. 2 is a top view of a 4-vane vortex inducing device;

FIG. 3 is a side view of a single-vane device;

FIG. 4 is a side view of a twin-blade structure;

FIG. 5 is a 3-vane structure;

FIG. 6 illustrates the use of a straightening vane.

As shown in FIG. 1, a lithium solution 11 with a top layer of 2-ethyl-n-hexanol 12 is drained via exit 13 from a compartment 14 of the cooling machine, through the conduit 15 and via pump 16. On top of the exit 13 there is provided a vane structure according to the invention.

Such a vane structure can be of the type shown in FIG. 2, which comprises three vanes 21, 22, and 23, which are rectangular sheets of metal bent into a curved shape. These are positioned in an upright position, and thus define three inlets 24, 25 and 26, through which the liquid enters, a vortex is formed and the lower liquid and the surface layer are thoroughly intermixed, before they leave via the exit 13. A single vane structure for inducing a vortex is illustrated with reference to FIG. 3. The vane 31 is bent into a helical shape and this is attached at its lower ends to the bottom 32 of the part of the refrigeration machine, the liquid enters through the lateral opening 33, a vortex is induced and the liquid mixture leaves through exit 34.

FIG. 4 illustrates a 2-vane structure comprising two vanes 41 and 42 defining lateral entry ports 43 and 44. The thoroughly mixed liquids leave through exit 45.

A three vane structure similar to that of FIG. 2 is illustrated in FIG. 5, and here 3 vanes 51, 52 and 53 define a vortex-inducing structure provided with lateral openings which are open along the entire height of the device, namely openings 54, 55 and 56, the liquid leaving through the exit 57.

As the vortex induced is sometimes too violent, it is advisable to provide a flow-straightener. This comprises a metal strip, of elongated rectangular shape. This is illustrated with reference to FIG. 6, where in exit pipe 61 there is provided the strip 62, which is bent at its upper end 63 and which defines a straight section 64 lower on.

The above description is by way of illustration only and many changes and modifications in the shape and arrangement of parts may be resorted to without departing from the spirit and the scope of the invention.

We claim:

1. A vortex-inducing structure for use in an aqueous system, said vortex-inducing structure comprising:

a compartment defining a single drain at the bottom of the compartment for draining a first liquid floating on top of another liquid, at least one helical vane fixed to the bottom of the container at its bottom edge and being located above and surrounding the drain of the compartment for intimately mixing the liquids with each other, the center defined by said at least one helical vane being free so as avoid obstructing the formation of a vortex, and a lateral inlet defined by said at least one helical vane located along substantially the entire height of the at least one helical vane so that both liquids enter into the interior of the vane structure, are intimately mixed, and exit through the drain.

2. A structure according to claim 1, wherein said vortex-inducing structure comprises from two to four vanes, said vanes being formed from curved sheet metal.

3. A structure according to claim 1, wherein said said at least one helical vane is of funnel shaped configuration.

4. A structure according to claim 1, wherein said device further comprises an exit conduit connected to the drain, flow-straightening means being located in the exit conduit.

5. A structure according to claim 4, wherein the flow-straightening means comprises a rectangular metal strip having a curved shape at its upper end and a straight configuration at its lower end, said strip being located in the exit conduit.

* * * * *